(12) United States Patent
Eno et al.

(10) Patent No.: US 8,130,368 B2
(45) Date of Patent: Mar. 6, 2012

(54) DISTANCE MEASURING APPARATUS

(75) Inventors: Taizo Eno, Tokyo (JP); Masayuki Momiuchi, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 957 days.

(21) Appl. No.: 12/126,457

(22) Filed: May 23, 2008

(65) Prior Publication Data

US 2009/0052288 A1  Feb. 26, 2009

(30) Foreign Application Priority Data

May 25, 2007  (JP) ................................. 2007-139420

(51) Int. Cl.
*G01C 3/08* (2006.01)

(52) U.S. Cl. ..................... 356/5.01; 356/3.01; 356/4.01; 356/5.1; 356/5.15

(58) Field of Classification Search ......... 356/3.01–3.15, 356/4.01–4.1, 5.01–5.15, 6–22, 28, 28.5
See application file for complete search history.

(56) References Cited

U.S. PATENT DOCUMENTS

| | | | | |
|---|---|---|---|---|
| 7,333,184 B2 * | 2/2008 | Kalayeh | ...................... | 356/4.07 |
| 7,375,803 B1 * | 5/2008 | Bamji | ........................... | 356/4.01 |
| 7,961,301 B2 * | 6/2011 | Earhart et al. | ............... | 356/4.01 |
| 2010/0079744 A1 | 4/2010 | Eno et al. | | |
| 2010/0079745 A1 | 4/2010 | Eno et al. | | |

FOREIGN PATENT DOCUMENTS

| | | |
|---|---|---|
| JP | 06-242478 A | 9/1994 |
| JP | 09-211512 A | 8/1997 |
| JP | 09-318743 | 12/1997 |
| JP | 2003-304019 A | 10/2003 |
| JP | 2008-249658 A | 10/2008 |

* cited by examiner

*Primary Examiner* — Thomas Tarcza
*Assistant Examiner* — Luke Ratcliffe
(74) *Attorney, Agent, or Firm* — Brinks, Hofer, Gilson & Lione

(57) ABSTRACT

A distance measuring apparatus for measuring a distance to a target point in a target area comprises a laser oscillator for generating a laser beam having a first wavelength, a nonlinear crystal into which the laser beam having the first wavelength generated by the laser oscillator enters, the nonlinear crystal generating a laser beam having a second wavelength, a collimator lens at which the laser beam having the first wavelength generated by the laser oscillator and the laser beam having the second wavelength generated by the nonlinear crystal are concentrated and are transformed into parallel light flux, a laser device provided with the laser oscillator, the nonlinear crystal, and the collimator lens, an output unit for outputting the laser beam having the first wavelength and the laser beam having the second wavelength at the same time, which are emitted by the laser device, while scanning the target area, a selective reflective mirror for selectively reflecting the laser beam having the first wavelength and the laser beam having the second wavelength that are reflected at the target point in the target area, a first light receiving unit which receives the laser beam having the first wavelength selected at the selective reflective mirror and outputs a first signal, a second light receiving unit which receives the laser beam having the second wavelength selected at the selective reflective mirror and outputs a second signal, and a signal processing unit for measuring the distance to the target point in the target area by selecting one of the first signal and the second signal.

8 Claims, 9 Drawing Sheets

DISTANCE MEASURING APPARATUS

This application claims priority under 35 U.S.C. §119 to Japanese Patent Application No. JP2007-139420 filed May 25, 2007, the entire content of which is hereby incorporated by reference.

BACKGROUND OF THE INVENTION

1. Technical Field

The present invention relates to a distance measuring apparatus for measuring distances using laser beams, and the present invention specifically relates to a distance measuring apparatus in which two kinds of laser beams, having different wavelengths, are simultaneously output.

2. Background Art

As a technique for measuring distances using a laser beam, a technique of using two kinds of laser beams, having different wavelengths, is known. For example, Japanese Unexamined Patent Application Publication No. 9-318743 discloses a structure in which two kinds of laser beams, having different wavelengths, are combined and emitted at an object. In this technique, a target object is identified according to an intensity ratio of the two wavelengths of reflected light, and the distance to the object is calculated from the response time of the reflected light. The above reference discloses a structure in which a laser oscillator for two kinds of lasers, having different wavelengths, is provided in an apparatus, and these two kinds of lasers are appropriately combined or switched in an optical system.

There are the following problems in measurement of a distance using a laser beam. The first problem is that reflection intensity of a target object depends on the wavelength of light. The reflectivity depends on the wavelength according to the color and the material of the target object. Therefore, light may be reflected at low intensity when a combination of a target object and the wavelength is inappropriate, and the reflected light is thereby not easily detected.

The second problem is the influence of the measurement environment. That is, a laser beam having a shorter wavelength scatters and is greatly attenuated when there is fog or smog present.

The third problem is safety for the eyes. Light having a wavelength of not more than that in the visible light range may be transmitted through the eyeball and may be very easily absorbed by the eyeground. Therefore, light may have a deleterious effect on the eye when the intensity thereof is high.

For example, since light having an infrared wavelength of not less than 1400 nm is not substantially transmitted through the cornea, the crystal lens, and the corpus vitreum and is not substantially absorbed by the eyeground, a high-power laser beam can be used safely. Therefore, a laser beam having an infrared wavelength of not less than 1400 nm is called an "eye-safe laser". On the other hand, a laser beam having a wavelength of around 1000 nm has a transmission rate of approximately 40% with respect to the crystal lens, and the like and has an absorption rate of approximately 10% with respect to the eyeground. Therefore, the laser beam may have a deleterious effect on the eye when the power thereof is high. A laser beam having a wavelength of around 500 nm has a transmission rate of approximately 90% with respect to the crystal lens, and the like, and has an absorption rate of approximately 70% with respect to the eyeground. Accordingly, such a laser beam may have worse effects on the eye.

The fourth problem is that light having a long wavelength is useful for measuring long distances, but is inferior in measurement resolution because diffraction spread is large. On the other hand, light having a short wavelength is superior in measurement resolution, but is not useful for measuring long distances because the light may easily scatter.

As a method for solving these problems, a method using laser beams having different wavelengths may be mentioned. Japanese Unexamined Patent Application Publication No. 9-318743 discloses a structure comprising laser oscillators with respect to each wavelength. Since such a structure is complicated, the apparatus may not be of compact design, and the production cost cannot be reduced.

SUMMARY OF THE INVENTION

In view of the above background, an object of the present invention is to provide a technique for a device for generating a laser beam in a distance measuring apparatus using laser beams, the device being of compact design and having a lower production cost.

The invention according to a first aspect of the invention provides a distance measuring apparatus comprising an output unit having a laser device, a selective reflective mirror, a first light receiving unit, a second light receiving unit, and a signal processing unit. The laser device comprises a laser oscillating portion, a nonlinear crystal, and a collimator lens. The laser oscillating portion generates a laser beam having a first wavelength, and the nonlinear crystal generates a laser beam having a second wavelength after the laser beam having a first wavelength generated by the laser oscillating portion enters thereinto. In the collimator lens, the laser beam having the first wavelength generated by the laser oscillating portion, and the laser beam having the second wavelength generated by the nonlinear crystal, are concentrated and are transformed into parallel light fluxes. The output unit outputs the laser beam having the first wavelength and the laser beam having the second wavelength at the same time while scanning a target area. The selective reflective mirror selectively reflects the laser beam having the first wavelength and the laser beam having the second wavelength, which are reflected at a target point in the target area. The first light receiving unit receives the laser beam having the first wavelength, which is selected by the selective reflective mirror, and outputs a first signal. The second light receiving unit receives the laser beam having the second wavelength, which is selected by the selective reflective mirror, and outputs a second signal. The signal processing unit measures a distance to the target point in the target area by selecting one of the first signal and the second signal.

According to the invention of claim 1, a laser beam having the second wavelength, which is a harmonic wave of a first wavelength, is generated by a function of the nonlinear crystal from a laser beam having the first wavelength generated by the laser oscillating portion. These two laser beams having different wavelengths are transformed into parallel light fluxes by the collimator lens and are output from the same optical path at the same time. Therefore, laser oscillators are not required with respect to each wavelength, whereby a structure of a laser device can be simplified. Accordingly, an apparatus having the laser device can be of compact design and have a lower production cost. These two laser beams having different wavelengths are output from the same optical path at the same time, whereby the cycle time is not delayed during an output operation.

A harmonic wave of the n-th order (natural number in which n=2, 3, 4 . . . ) may be used. The laser oscillating portion generates a laser beam having an appropriate wavelength and power. The collimator lens outputs two laser beams having different wavelengths at the same time and is adjusted to a position of an optical axis at which these two laser beams having different wavelengths are relatively collimated (transformed into parallel light fluxes).

These two laser beams having different wavelengths are reflected at a target point and are selected by the selective reflective mirror, so that each of these two laser beams is simultaneously received by the first light receiving unit or the second light receiving unit. In this case, the signal processing unit appropriately selects one of the output signal of the first light receiving unit and the output signal of the second light receiving unit so as to process the selected signal. Therefore, it is not necessary to process signals with respect to each wavelength, and the dimension of a circuit is thereby reduced.

In the invention of claim 2 according to the first aspect of the invention, the laser beam having the first wavelength is infrared light that has a longer wavelength, and the laser beam having the second wavelength is a second harmonic wave of the first wavelength and is visible light that has a shorter wavelength.

According to the invention of claim 2, infrared laser light, which does not easily scatter and is useful for measuring long distances, and a laser beam in the visible light range, which is superior in measurement resolution, are used. Therefore, the above first to fourth problems can be avoided.

In the invention of claim 3 according to the first aspect of the invention, the laser oscillating portion comprises a laser medium that is a crystal or a fiber doped with $Nd^{3+}$ or $Er^{3+}$.

In the invention of claim 4 according to the first aspect of the invention, the distance measuring apparatus further comprises an operating unit for selecting the distance to the target area whether it is near or far. In the signal processing unit, one of the first signal and the second signal is selected according to the distance to the target area selected by the operating unit, and the distance to the target point in the target area is measured. In this case, the signal processing unit can measure a distance by selecting a signal of received light having an appropriate wavelength according to the approximate distance to the target area.

In the invention of claim 5 according to the first aspect of the invention, the distance measuring apparatus further comprises an operating unit for selecting a transparency of the air in the target area. In the signal processing unit, one of the first signal and the second signal is selected according to the transparency of the air in the target area selected by the operating unit, and the distance to the target point in the target area is measured. In this case, the signal processing unit can measure a distance by selecting a signal of received light having an appropriate wavelength according to the transparency of the air in the measurement environment.

In the invention of claim 6 according to the first aspect of the invention, the distance measuring apparatus further comprises an image capturing unit for capturing an image of the target area and comprises an image processing unit. The image processing unit separates the image, which is captured by the image capturing unit, into images with respect to each of the colors red, green, and blue. In the signal processing unit, one of the first signal and the second signal is selected according to the color component of the image, in which colors are separated by the image processing unit, and the distance to the target point in the target area is measured. In this case, the wavelength of light for measuring a distance can be selected in view of the reflection efficiency, depending on the material and the color of an object. That is, a distance can be measured by using a wavelength with a higher reflection efficiency. Therefore, failure of a distance measurement and decrease in measurement accuracy due to low intensity of reflected light may not occur.

In the invention of claim 7 according to the first aspect of the invention, the signal processing unit selects one of the first signal and the second signal according to the intensity of light received at the first light receiving unit and the second light receiving unit, so as to measure the distance to the target point in the target area. In this case, a distance can be measured by using a laser beam that is reflected at a higher intensity. Therefore, failure of a distance measurement and decrease in measurement accuracy due to low intensity of reflected light may not occur.

According to the present invention, in an apparatus for measuring distances using laser beams, a device for generating a laser beam can be of compact and be produced at lower cost, and the problems of dependence on wavelength are avoided.

BRIEF DESCRIPTION OF DRAWINGS

PREFERRED EMBODIMENTS OF THE INVENTION (1) First Embodiment 1-1: Structure of Laser Device An example of a laser device for generating two kinds of laser beams having different wavelengths at the same time will be described. In this case, the laser device comprises a function of generating pulsed laser beams having different wavelengths. FIG. 1 shows a laser device 100 for generating a pulsed laser beam by Q-switching. The laser device 100 is an LD-pumped solid-state laser device (laser diode-pumped solid-state laser device) comprising a semiconductor laser unit 101, a focusing lens 102, a laser resonator 103, a nonlinear crystal 107, and a collimator lens 108.

Figure 1:
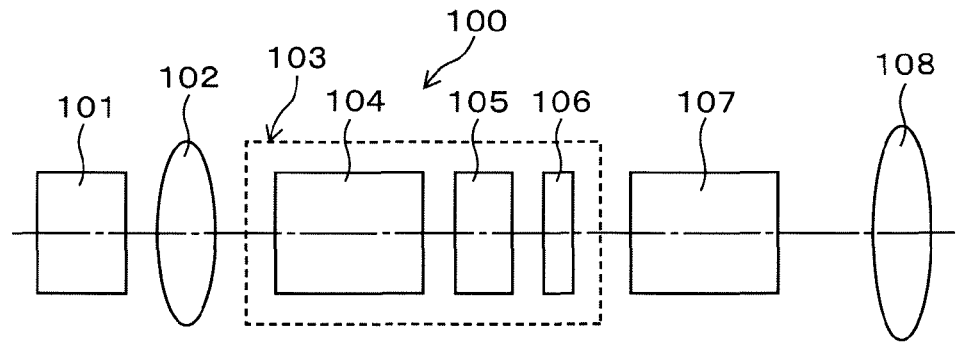
FIG. 1 is a schematic drawing showing an example of a laser device for generating two kinds of laser beams having different wavelengths at the same time.

The semiconductor laser unit 101 comprises an AlGaAs laser diode for generating a laser beam for excitation, which has an oscillation peak wavelength of 808 nm. The focusing lens 102 concentrates light output from the semiconductor laser unit 101. The laser beam having a wavelength of 808 nm that is concentrated enters the laser resonator 103.

The laser resonator 103 is exited by the laser beam having a wavelength of 808 nm generated by the semiconductor laser unit 101, and the laser resonator 103 lases. The laser resonator 103 is provided with a laser medium 104, a saturable absorber 105, and an output mirror 106 at the inside thereof. The laser medium 104 has a side into which the laser beam for excitation enters, and the side of the laser medium 104 is coated with a mirror surface (not shown in the figure). This mirror surface transmits light, which enters the laser medium 104 and has a wavelength of 808 nm, and reflects light which passes through the inside to the outside of the laser medium 104 and has a wavelength of 1064 nm.

The laser medium 104 is an amplifying medium for lasing and is made of a crystal or a fiber doped with neodymium ions ($Nd^{3+}$) or erbium ions ($Er^{3+}$). As a crystal to be doped, an yttrium aluminum garnet crystal ($Y_3Al_5O_{12}$) and an yttrium vanadate crystal ($YVO_4$) may be mentioned. That is, Nd:YAG or Nd:$YVO_4$ may be used. The laser medium 104 is excited by the semiconductor laser unit 101 and forms a population inversion, and a laser beam having a wavelength of 1064 nm is thereby radiated by stimulated emission.

The saturable absorber 105 functions as a passive Q-switch and works as an absorber while the intensity of light is low. When the intensity of light is high, the light absorption coefficient of the saturable absorber 105 is decreased (absorption of light is saturated), and the saturable absorber 105 becomes transparent with respect to a laser beam. By using these characteristics, a laser beam can be intermittently output. That is, while the laser medium 104 is excited and forms a population inversion, the saturable absorber 105 absorbs a laser beam, which is radiated by stimulated emission and has a wavelength of 1064 nm, so as to prevent lasing (decrease Q factor).

When the laser medium 104 forms a large population inversion, and energy is sufficiently stored, the saturable absorber 105 becomes transparent with respect to a laser beam (the Q factor is suddenly increased). Then, a laser beam is instantly generated at an intensity of approximately $10^3$ to $10^4$ times as much as that of an ordinary laser beam while emitting the stored energy in a short time, and the lasing stops. That is, a giant pulse is emitted by lasing of the Q-switch. The saturable absorber 105 is made of a YAG crystal doped with chromium ions ($Cr^{4+}$). The saturable absorber 105 may have a structure using an electrooptical technique or an acoustooptical technique as a Q-switch.

In the output mirror 106, the reflectivity is set so as to obtain freely selected pulse characteristics. For example, the output mirror 106 reflects approximately 90% of a laser beam and transmits approximately 10% of the laser beam that enters thereinto and has a wavelength of 1064 nm. The distance between the mirror surface (not shown in the figure) formed on the laser beam 104 at the side into which a laser beam enters and the output mirror 106 is set so as to form a cavity (resonator) for forming a stationary wave having a wavelength of 1064 nm.

The nonlinear crystal 107 generates a harmonic wave of a laser beam that is a pulsed output from the laser resonator 103. The nonlinear crystal 107 efficiently generates a second harmonic wave because of optical nonlinearity. For example, the nonlinear crystal 107 may be made of a KTP crystal ($KTiOPO_4$) or a LBO crystal ($LiB_3O_5$). When a laser beam (fundamental wave) having a wavelength of 1064 nm enters into the nonlinear crystal 107, the nonlinear crystal 107 outputs a laser beam having a wavelength of 1064 nm and a laser beam having a wavelength of 532 nm that is a second harmonic wave.

The collimator lens 108 concentrates two kinds of laser beams, which enter thereinto and have a different wavelength, and transforms these laser beams into parallel light fluxes (beam shape) that is suitable for measuring a distance. The focal position of the collimator lens 108 is adjusted to locate at the center of the optical axis of the resonator of the laser resonator 103. The collimator lens 108 on the optical axis is adjusted so as to be located at the middle of a position, at which a laser beam having a wavelength of 1064 nm is entirely transformed into parallel light flux by the collimator lens 108, and a position, at which a laser beam having a wavelength of 532 nm is entirely transformed into parallel light flux by the collimator lens 108.

1-2: Operation of Laser Device

Figure 2:
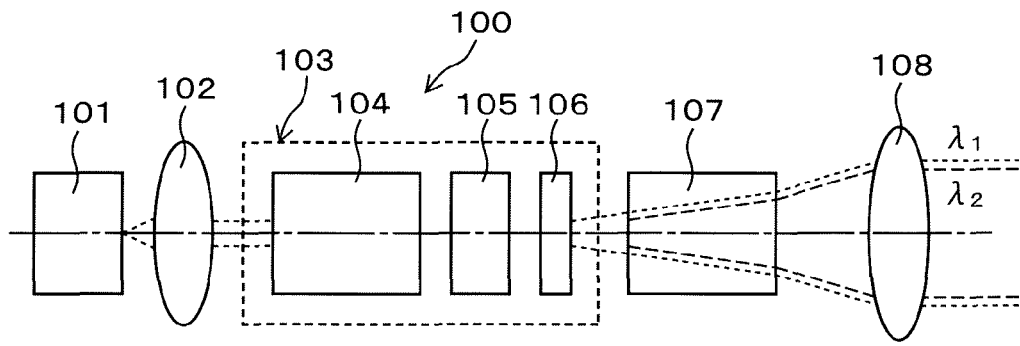
FIG. 2 is a schematic drawing showing an example of an operation of the laser device in FIG. 1.

FIG. 2 is a schematic drawing showing an example of an operation of the laser device in FIG. 1. FIG. 2 schematically shows a condition in which a pulsed laser beam having a wavelength of 1064 nm ($=\lambda_1$) and a pulsed laser beam having a wavelength of 532 nm ($=\lambda_2$) are simultaneously output. First, the semiconductor laser unit 101 continuously generates (CW oscillation) a laser beam having a wavelength of 808 nm. The laser beam is concentrated by the focusing lens 102 and enters the laser resonator 103. The laser medium 104 is excited by the pump light having a wavelength of 808 nm and forms a population inversion, and a coherent laser beam having a wavelength of 1064 nm ($\lambda_1$) is thereby radiated by stimulated emission. In this case, a part of the laser beam is output from the output mirror 106 to the outside and enters into the nonlinear crystal 107. The pulsed laser beam which has entered the nonlinear crystal 107 is transmitted therethrough and reaches the collimator lens 108.

When an integrated intensity of the laser beam reaches a predetermined level, light absorption of the saturable absorber 105 is saturated, and the saturable absorber 105 becomes transparent with respect to the laser beam. The laser beam having a wavelength of 1064 nm is stored in the laser medium 104 by a large population inversion. Then, the laser beam is reflected repeatedly between the mirror surface (not shown in the figure) and the output mirror 106, and a stationary wave having a large amplitude is thereby rapidly generated, and lasing of Q-switch is started. As a result, a laser beam having a wavelength of 1064 nm is emitted from the output mirror 106.

Then, the laser resonator 103 stops lasing and is reexcited by the laser beam, which enters from the semiconductor laser 100 and has a wavelength of 808 nm. The laser resonator 103 forms a population inversion, and a laser beam having a wavelength of 1064 nm ($\lambda_1$) is thereby radiated by stimulated emission. When an integrated intensity of a laser beam reaches a predetermined level, light absorption of the saturable absorber 105 is saturated, and the saturable absorber 105 becomes transparent. As a result, lasing of the Q-switch is restarted. This operation is periodically repeated, whereby pulsed oscillation of a laser beam having a wavelength of 1064 nm ($\lambda_1$) is performed.

The pulsed laser beam having a wavelength of 1064 nm ($\lambda_1$) is output from the laser resonator 103 and enters into the nonlinear crystal 107, whereby the nonlinear crystal 107 performs a second harmonic generation (SHG) because of the optical nonlinearity effect. As a result, the nonlinear crystal 107 outputs a pulsed laser beam having a wavelength of 1064 nm ($\lambda_1$) and a pulsed laser beam having a wavelength of 532 nm ($\lambda_2$). These two kinds of pulsed laser beams having different wavelengths output from the nonlinear crystal 107 are collimated by the collimator lens 108. These pulsed laser beams entering the collimator lens 108 are transformed into parallel light fluxes and are output to the outside of the device.

1-3: Superiority of Laser Device

Superiority of the laser device shown in FIGS. 1 and 2 will be described. The laser device 100 outputs two kinds of pulsed laser beams at the same time, one of the pulsed laser beams has a longer wavelength due to the effect of the nonlinear crystal 107 and has a wavelength of 1064 nm, and the other pulsed laser beam has a shorter wavelength of 532 nm. According to this structure, the structure of an apparatus may be simplified compared to a case in which devices are required with respect to each wavelength. Therefore, an apparatus can be of compact design and have a low production cost, and the problems relating the dependency on wavelength can be avoided.

Since two kinds of pulsed laser beams having different wavelengths are simultaneously output, cycle time is not delayed when a distance to an object is measured by using the laser device 100. This is because it is not required to measure the distance by changing two kinds of pulsed laser beams in accordance with the reflection intensity and the measuring distance to the target object, and measurement environment. In a case in which the optical path of a pulsed laser beam having a wavelength of 1064 nm and the optical path of a pulsed laser beam having a wavelength of 532 nm are different from each other, output positions of the laser beams require corrections for the difference of the optical paths. However, in this case, two kinds of the laser beams having different wavelengths are output at the same optical path, whereby the correction is not required. Therefore, a distance can be measured rapidly, and the problems relating the dependence on wavelength are avoided.

Figure 3:
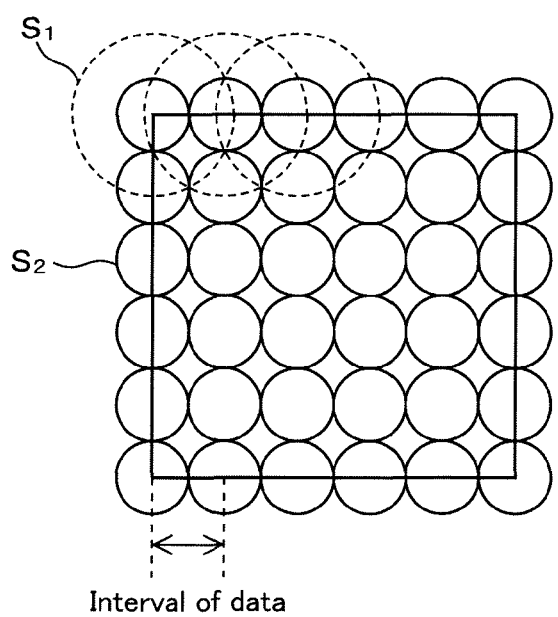
FIG. 3 is a schematic drawing for explaining a superiority of the laser device shown in FIG. 1.

As shown in FIG. 3, when the spot diameters ($\lambda_1$: $S_1$ and $\lambda_2$: $S_2$) of laser beams emitted on a target object greatly differ from each other according to the wavelength, resolution changes in accordance with the wavelength.

(2) Second Embodiment

Figure 4:
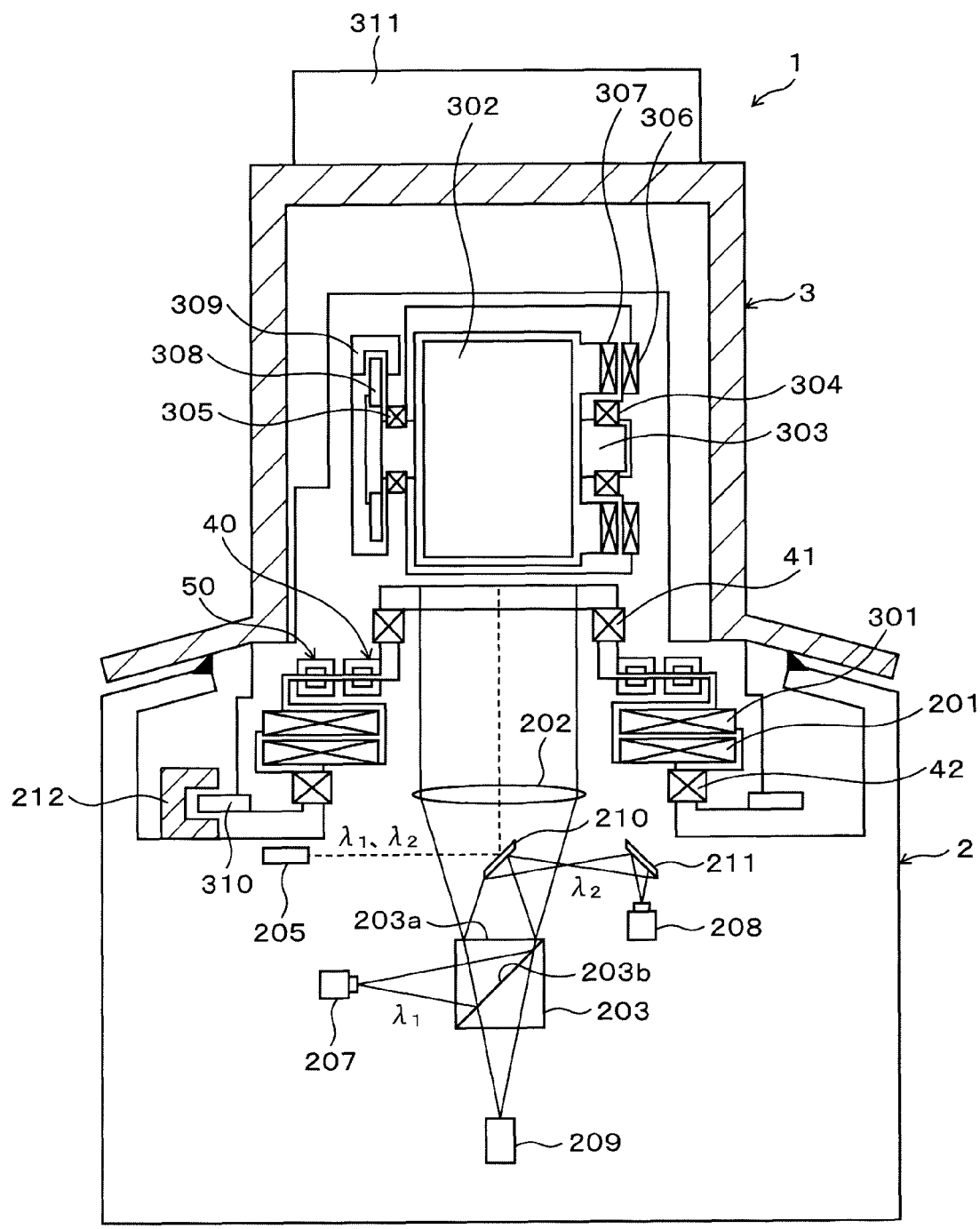
FIG. 4 is a schematic drawing showing an example of a distance measuring apparatus using the laser device in FIG. 1.

Hereinafter, an example of a distance measuring apparatus using a laser device that is exemplified in the First Embodiment will be described. FIG. 4 shows an example of a distance measuring apparatus using the present invention.

Outline of Distance Measuring Apparatus

FIG. 4 shows a distance measuring apparatus 1 comprising a body 2 and a rotational optical portion 3 that is rotatable with respect to the body 2. The rotational optical portion 3 is rotatably mounted on the body 2 via bearings 41 and 42. Data signal transmission between the body 2 and the rotational optical portion 3 and electric power supply from the body 2 to the rotational optical portion 3 are controlled via a data transmitting device 40 and an electric power transmitting device 50. These transmitting devices comprise coils at both sides of the body 2 and the rotational optical portion 3, and the coils at both sides have a rotational center as an axis and are slightly separated. According to this structure, data signals and electric power are transmitted by mutual induction, which is generated between the coils, regardless of the rotation of the rotational optical portion 3.

Rotational Structure

A stator 201 is arranged in the body 2 and comprises a structure in which plural magnetic poles wound with a coil are disposed on the circumference. A rotor 301 is arranged at a portion of the rotational optical structure 3 that faces the stator 201. The rotor 301 has a structure comprising plural permanent magnets on the circumference. When the plural magnetic poles of the stator 201 are switched on and are supplied with electric power by a control circuit (not shown in FIG. 4), power for rotating the rotor 301 with respect to the stator 201 occurs, whereby the rotational optical portion 3 rotates with respect to the body 2. The rotational structure of the stator 201 and the rotor 301 forms a DD (Direct Drive) motor utilizing a function of a brushless DC motor.

Structure of Body 2

A structure of the body 2 will be described hereinafter. The body 2 comprises a focusing lens 202, and an inclined reflective mirror 210 is arranged behind (downward in the figure) the focusing lens 202. The inclined reflective mirror 210 has reflective surfaces at both sides. A selective reflective mirror 203 is arranged under the inclined reflective mirror 210. The selective reflective mirror 203 is a dichroic mirror and is provided with a reflective surface 203a at an upper surface. The reflective surface 203a selectively upwardly reflects light having a wavelength of 532 nm ($\lambda_2$), which is some of the light that enters from the upward direction in the figure, and transmits light having the other wavelengths downwardly. In addition, the selective reflective mirror 203 is provided with an inclined reflective surface 203b. The reflective surface 203b selectively reflects light having a wavelength of 1064 nm ($\lambda_1$) to the left of the figure, which is some of the light that enters from the upward direction of the figure, and transmits light having the other wavelengths downwardly.

A first light receiving unit 207 for detecting light having a wavelength of 1064 nm ($\lambda_1$) is arranged at the left side of the selective reflective mirror 203. An inclined reflective mirror 211 is arranged at the right side of the inclined reflective mirror 210, and a second light receiving unit 208 for detecting light having a wavelength of 532 nm ($\lambda_2$) is arranged under the inclined reflective mirror 211. Each of the first light receiving unit 207 and the second light receiving unit 208 comprises a photo diode and a peripheral circuit, and the photo diode is sensitive to the range of wavelengths to be detected. A distance-measuring light emitting unit 205 is arranged at the left of the inclined reflective mirror 210 and comprises a laser device 100 shown in FIG. 1. A CCD camera 209 is arranged under the selective reflective mirror 203, and the CCD camera 209 captures an image that is reflected at the rotational reflective mirror 302 and outputs the image data.

A laser beam having a wavelength of 1064 nm ($\lambda_1$) and a laser beam having a wavelength of 532 nm ($\lambda_2$) (distance-measuring lights) are output from the distance-measuring light emitting unit 205. According to the structure provided with the above selective reflective mirror 203, these laser beams are upwardly reflected at the upper surface of the inclined reflective mirror 210 and enter into the focusing lens 202 from the downward direction. These two kinds of laser beams having different wavelengths, which enter into the focusing lens 202 from downward direction, are reflected at the rotational reflective mirror 302 and are output to the outside of the distance measuring apparatus 1.

Light which enters from the outside of the distance measuring apparatus 1 into the rotational reflective mirror 302 is downwardly reflected thereat, and the light is concentrated at the focusing lens 202 and enters into the selective reflective mirror 203. Light having a wavelength of 532 nm ($\lambda_2$), which is some of the light that enters into the selective reflective mirror 203, is selectively upwardly reflected at the reflective surface 203a, and light having the other wavelengths is transmitted through the reflective surface 203a. The light having a wavelength of 532 nm ($\lambda_2$), which is upwardly reflected at the reflective surface 203a, is reflected at the lower surface of the inclined reflective mirror 210 in the right direction. Then, the light is downwardly reflected at the inclined reflective mirror 211 and reaches the second light receiving unit 208.

On the other hand, light having a wavelength of 1064 nm (XI), which is some of the light that is transmitted through the reflective surface 203a, is selectively reflected at the reflective surface 203b in the left direction and reaches the first light receiving unit 207. Light having wavelengths other than 1064 nm ($\lambda_1$), which is some of the light that is transmitted through the reflective surface 203a, is transmitted through the reflective surface 203b and reaches the CCD camera 209. Thus, light, which enters from the outside of the apparatus and has a wavelength of 1064 nm ($\lambda_1$), is detected at the first light receiving unit 207, and light having a wavelength of 532 nm ($\lambda_2$) is detected at the second light receiving portion 208. Light having the other wavelengths is detected by the CCD camera 209. That is, two kinds of distance-measuring lights having different wavelengths can be separately detected, while an image reflected on the rotational reflective mirror 302 can be captured by the CCD camera 209.

The body 2 comprises an angle-reading unit 212 of a rotary encoder for detecting a direction to which the rotational optical portion 3 faces (horizontal angle (angle of direction)). The angle-reading unit 212 has a sideways U shape and comprises a light-emitting diode on a wall thereof and a phototransistor on the other wall thereof. The phototransistor detects pulsed light which passes between the light-emitting diode and the phototransistor, whereby a signal of angular information is output from the angle-reading unit 212. The pulsed light passes through a slit of an angle-read unit 310, which will be described hereinafter. The angle-read unit 310 and the angle-reading unit 212 form an angle-detecting device for detecting an angle by utilizing the same function as that of a general rotary encoder.

Structure of Rotational Optical Portion 3

A structure of the rotational optical portion 3 will now be described. The rotational optical portion 3 comprises a rotor 301 at a position opposite to the stator 201 of the body 2. The rotor 301 has plural permanent magnets on the circumference. Moreover, the rotational optical portion 3 comprises a rotational reflective mirror 302. The rotational reflective mirror 302 is mounted in the rotational optical portion 3 by a rotational shaft 303 for controlling an elevation angle, and the elevation angle thereof can be changed. The rotational shaft 303 for controlling an elevation angle is supported by a rotational optical portion 3 with bearings 304 and 305. An opening (not shown in the figure) is provided at the front of the rotational reflective mirror 302 so that the rotational reflective mirror 302 emits light to the outside and receives light from the outside.

A stator 306 is arranged in the rotational optical portion 3 and has a structure in which plural magnetic poles wound with a coil are disposed on the circumference. A rotor 307 is arranged at a portion of the rotational reflective mirror 302 side that faces the stator 306. The rotor 307 has a structure in which plural permanent magnets are disposed at the circumference. The rotational structure of the stator 306 and the rotor 307 forms a DD (Direct Drive) motor utilizing a function of a brushless DC motor. When the plural magnetic poles of the stator 306 are switched on and are supplied with electric power by a control circuit (not shown in FIG. 4), power for rotating the rotor 307 with respect to the stator 306 occurs. Accordingly, the elevation angle of the rotational reflective mirror 302 can be controlled.

An end of the rotational shaft 303 for controlling the elevation angle is mounted with an angle-read unit 308 that is formed with a slit in the circumferential direction. The rotational optical portion 3 comprises an angle-reading unit 309. The angle-reading unit 309 has a sideways U shape and comprises a light-emitting diode on a wall thereof and a phototransistor on the other wall thereof. The phototransistor detects pulsed light which passes between the light-emitting diode and the phototransistor, whereby a signal of angular information is output from the angle-reading unit 309. The pulsed light passes through a slit of the angle-read unit 308. The angle-read unit 308 and the angle-reading unit 309 form an angle-detecting device for detecting an angle by utilizing the same function as that of a general rotary encoder.

An angle-read unit 310 is arranged at the lower portion of the rotational optical portion 3 that has a circular ring shape and is formed with a slit in the circumferential direction. When the rotational optical portion 3 rotates, the angle-read unit 310 passes between the angle-reading unit 212 that has a sideways U shape. A sighting device 311 is disposed on the rotational optical portion 3 and is an optical sighting device that is used when an operator sights on a target object while operating the distance measuring apparatus 1. The sighting device 311 has a basic structure comprising a telescope with a mark or a scale for sighting.

Structure of Control System

Figure 5:
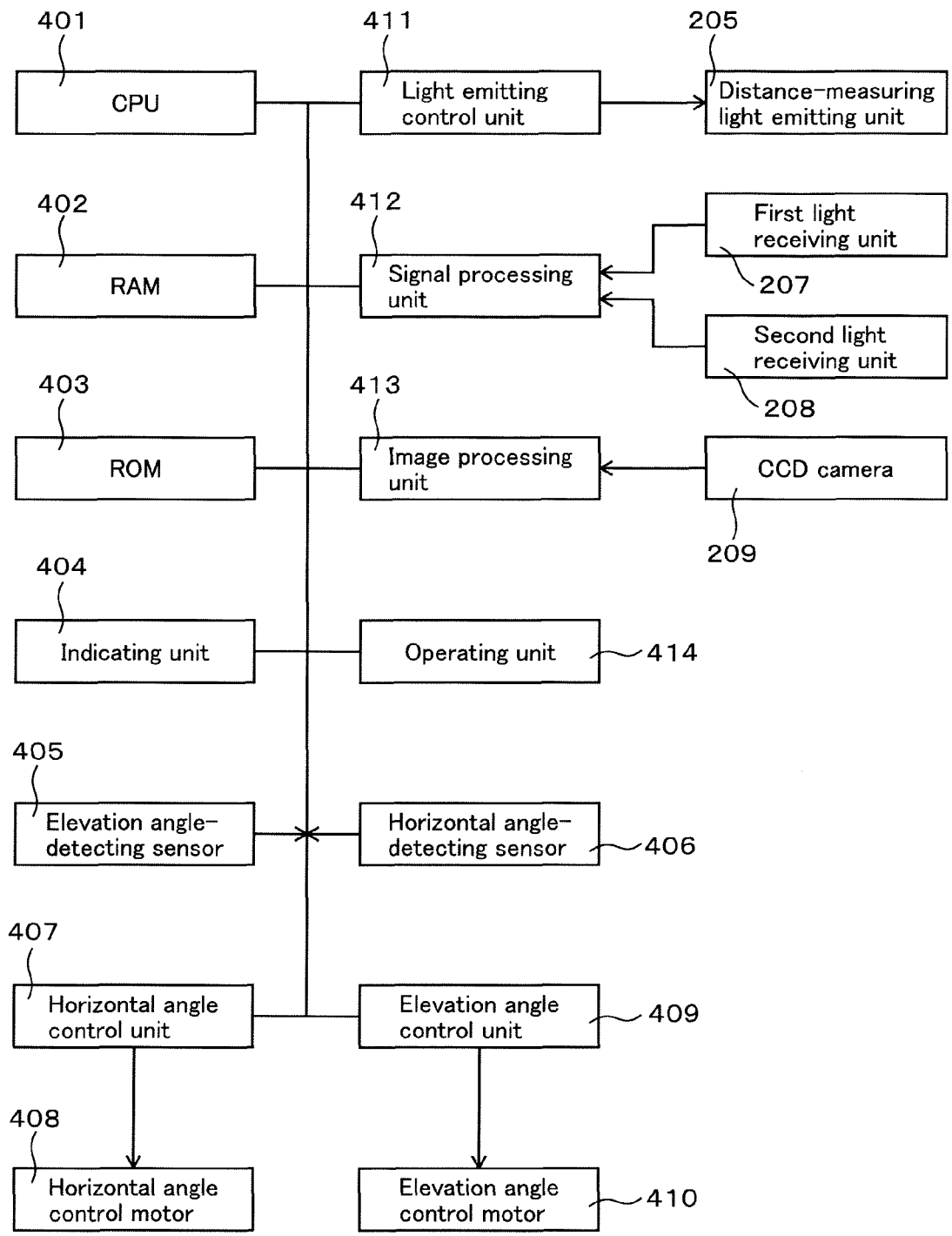
FIG. 5 is a block diagram showing a structure of a control system of the distance measuring apparatus in FIG. 4.

The structure of a control system of the distance measuring apparatus 1 will be described. FIG. 5 is a block diagram showing a structural example of a control system of the distance measuring apparatus 1 in FIG. 4. FIG. 5 shows a control system comprising a CPU 401, a RAM 402, a ROM 403, an indicating unit 404, an elevation angle-detecting sensor 405, a horizontal angle-detecting sensor 406, a horizontal angle control unit 407, a horizontal angle control motor 408, an elevation angle control unit 409, an elevation angle control motor 410, a light-emitting control unit 411, a distance-measuring light emitting unit 205, a signal processing unit 412, a first light receiving unit 207, a second light receiving unit 208, an image processing unit 413, a CCD camera 209, and an operating unit 414.

The CPU 401 controls the operation of the distance measuring apparatus 1 and calculates each processing. Specifically, the CPU 401 operates procedures, which will be described hereinafter, according to an operation program. The RAM 402 is used as a working area which temporarily stores programs and data while the CPU 401 operates each processing. The RAM 402 stores various conditions necessary for the operation, measured data, and the like. The RAM 402 comprises a semiconductor memory and a hard disk drive. Moreover, The RAM 402 comprises a nonvolatile memory so as to maintain data even when a main power supply is switched off. The ROM 403 stores operation programs to be performed by the CPU 401, conditions necessary for the operation, and the like.

The indicating unit 404 comprises a display (for example, a liquid crystal display) on which operating state of the distance measuring apparatus 1, information necessary for the operation, information about a distance measured, and the like are shown. The elevation angle-detecting sensor 405 detects the degree of elevation angle of the rotational reflective mirror 302 (see FIG. 4) and comprises an angle-read unit 308 and an angle-reading unit 309 shown in FIG. 4. The horizontal angle-detecting sensor 406 detects a horizontal angle (angle of direction) of the rotational optical portion 3 and comprises an angle-read unit 310 and an angle-reading unit 212 shown in FIG. 4.

The horizontal angle control unit 407 comprises a driving circuit for driving the following horizontal angle control motor 408 and comprises a control circuit for controlling the driving circuit. The horizontal angle control motor 408 is driven by the horizontal angle control unit 407 and rotates the rotational optical portion 3 (see FIG. 4), thereby controlling the horizontal angle of the rotational optical portion 3. The horizontal angle control motor 408 comprises a stator 201 and a rotor 301 shown in FIG. 4. The elevation angle control unit 409 comprises a driving circuit for driving the following elevation angle control motor 410 and comprises a control circuit for controlling the driving circuit. The elevation angle control motor 410 is driven by the elevation angle control unit 409 and controls the elevation angle of the rotational reflective mirror 302. The elevation angle control motor 410 comprises a stator 306 and a rotor 307 shown in FIG. 4.

The light-emitting control unit 411 controls timing of emission of light of the distance-measuring light emitting unit 205 (see FIG. 4). The signal processing unit 412 comprises a digital signal processor (DSP) and has following functions. That is, pulse signals of two kinds of pulsed laser beams having different wavelengths output from the first light receiving unit 207 and the second light receiving unit 208 are detected, one of the two pulsed laser beams having different wavelengths is selected to be used for measuring a distance, and time of flight of the laser beam is measured. The image processing unit 413 processes images according to an image data captured by the CCD camera 209 (see FIG. 4), and this image processing will be described hereinafter. The operating unit 414 is a means for manually inputting so as to operate the distance measuring apparatus 1 (see FIG. 4) and comprises various switches for operating.

Structure of Signal Processing Unit

Figure 6:
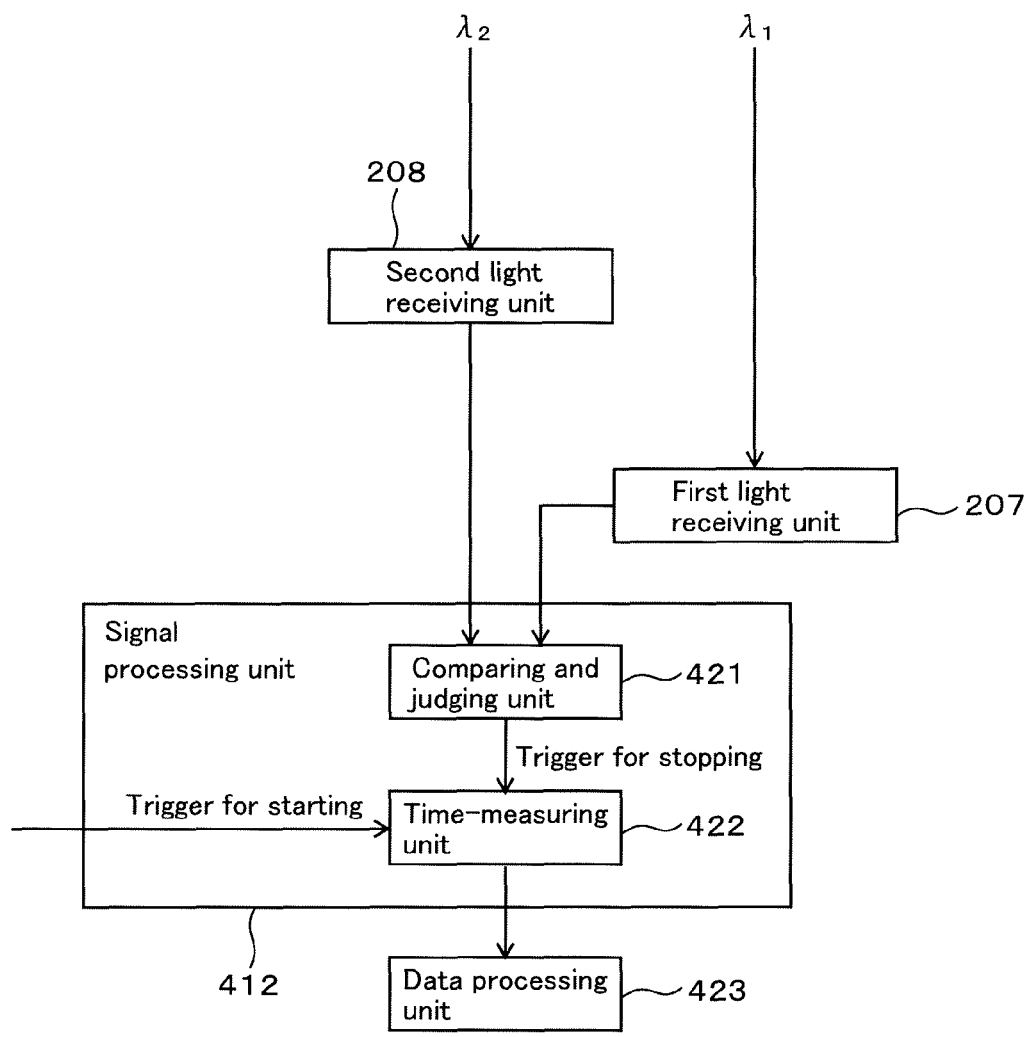
FIG. 6 is a functional block diagram for explaining a function of a signal processing unit.

An example of a structure of the signal processing unit 412 shown in FIG. 5 will now be described in detail. FIG. 6 is a block diagram for explaining functions of the signal processing unit 412. FIG. 6 schematically shows a situation in which a laser beam having a wavelength of 1064 nm ($\lambda_1$) enters into the first light receiving unit, and a laser beam having a wavelength of 532 nm ($\lambda_2$) enters into the second light receiving unit. Pulse signals are output from the first light receiving unit and the second light receiving unit and are amplified by amplifiers (not shown in the figure), and the pulse signals enter the signal processing unit 412.

As shown in FIG. 6, the signal processing unit 412 mainly comprises a comparing and judging unit 421 and a time-measuring unit 422. The comparing and judging unit 421 samples the pulse widths of the pulse signal of the first light receiving unit and the pulse signal of the second light receiving unit based on a predetermined frequency. In the comparing and judging unit 421, after the pulse signals are detected, one of the wavelengths of the pulse signals is selected to be used for measuring distances, and a trigger signal for stopping is output to the time-measuring unit 422.

When the distance-measuring light emitting unit 205 emits a laser beam, and a trigger signal for starting is input, the time-measuring unit 422 starts counting time. When a trigger signal for ending is input from the comparing and judging unit 421, the time-measuring unit 422 stops counting time. The time-measuring unit 422 stores the time when the counting is stopped (time of flight of a laser beam) in a buffer as a sequence data. The sequence data of the time of flight of a laser beam stored in the buffer is readable by a program stored in the ROM 403 (data processing unit 423), and the program will be described hereinafter.

First Operation for Measuring

Figure 7:
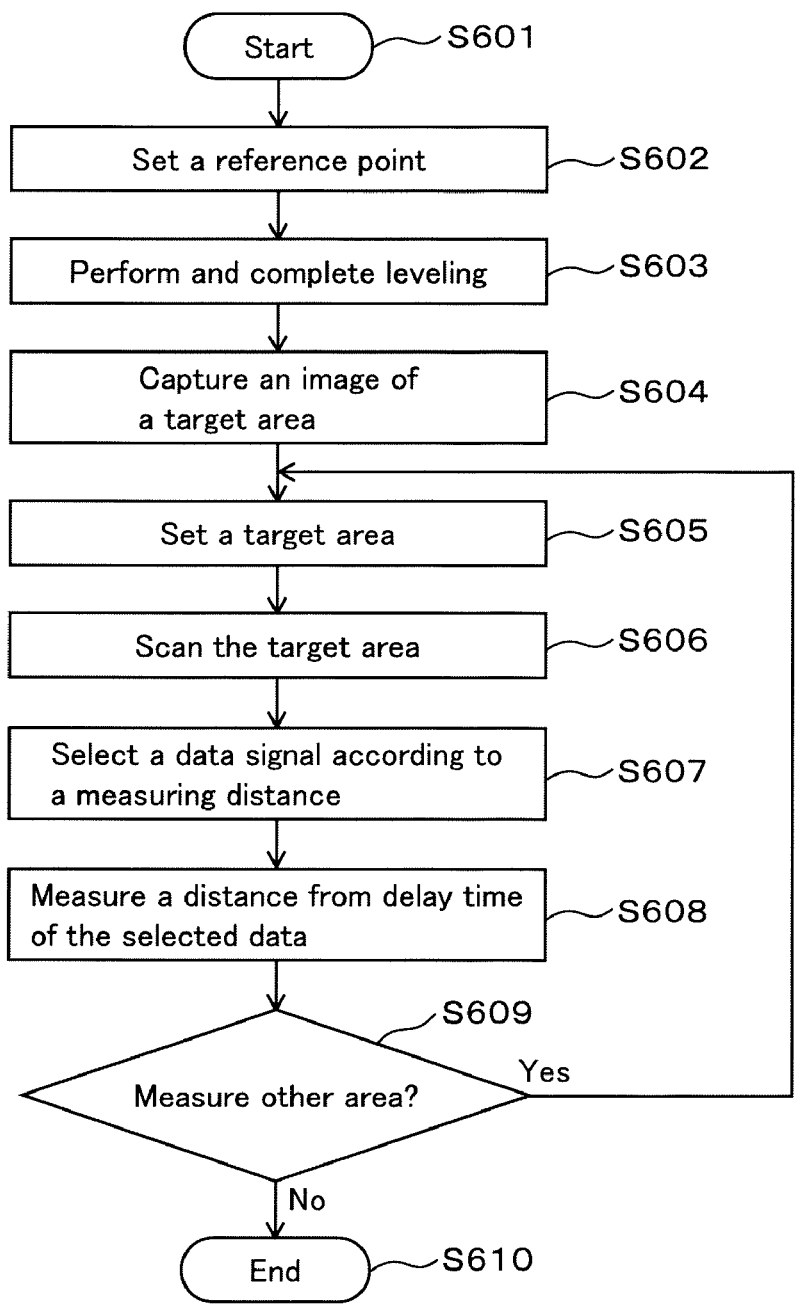
FIG. 7 is a flowchart showing an example of a procedure for measuring a distance.

An example of an operation for measuring distances in the distance measuring apparatus 1 shown in FIG. 4 will be described hereinafter. In this case, an example of an operation, in which the wavelength of a laser beam is selected according to a distance to an object to be measured, will be described. FIG. 7 is a flowchart showing an example of a procedure for measuring a distance. In this example, the operating unit 414 (see FIG. 5) of the distance measuring apparatus 1 comprises a button for manually setting a target area that is selected from a long-distance target area and a short-distance target area. The ROM 403 shown in FIG. 5 stores operation programs necessary for performing the following procedure.

When a process for measuring distances is started (step S601) by operating the operating unit 414 (see FIG. 5), the above operation program stored in the ROM 403 is read by the RAM 402, and the following operation is started. First, a reference point is set (step S602). Data relating to this reference point will be associated with data of distance to each target point, which is measured in the following process, and three dimensionally measured pieces of data are obtained in the end. The data relating to this reference point is input to the distance measuring apparatus 1 by manual input or by a data transmission from a position-identifying device using a GPS satellite, when the distance measuring apparatus 1 is set up in a target site.

After the step S602 is performed, a leveling is performed and is finished (step S603). In this step, the horizontal position and the direction of the apparatus are adjusted. This step is automatically performed based on outputs of a level and a direction sensor (not shown in the figure). When the steps S601 to S603 are finished, the state is displayed on the indicating unit 404 in FIG. 5. An operator of the distance measuring apparatus 1 sights an object, in which distance is measured, by using the sighting device 311 so as to set the approximate direction of the distance measuring apparatus 1. Then, the operating unit 414 in FIG. 5 is operated so as to capture an image of a target area by the CCD camera 209 (see FIG. 4) (step S604). A target area is set based on the image captured (step S605).

At this time, the operator operates the operating unit 414 and selects the measuring distance according to whether it is short or long (step S605). The operator measures the distance to the object by eye and performs an operation for setting a measurement range. In this case, the operator determines whether the distance to the object is in a measurement range of "a long distance" (approximately 50 m to 800 m) or in a measurement range of "a short distance" (approximately 1 m to 50 m). A laser beam having a wavelength of 1064 nm is appropriately used when the measuring distance is long, and a laser beam having a wavelength of 532 nm can be used when the measuring distance is short.

In a step S606, the target area is scanned by simultaneously outputting a pulsed laser beam having a long wavelength (wavelength of 1064 nm=$\lambda_1$) and a pulsed laser beam having a short wavelength (wavelength of 532 nm=$\lambda_2$). That is, the laser device (reference numeral 100 in FIG. 1), which forms the distance-measuring light emitting unit 205 in FIGS. 4 and 5, is operated in a state shown in FIG. 2. Then, the laser device outputs a pulsed laser beam having a wavelength of 1064 nm ($\lambda_1$) and a pulsed laser beam having a wavelength of 532 nm ($\lambda_2$) at the same time. These pulsed laser beams are output from the distance-measuring light emitting unit 205 in FIG. 4 and are reflected to the upward direction of the figure at the inclined reflective mirror 210. Then, these pulsed laser beams are emitted on the target area via the focusing lens 202 and the rotational reflective mirror 302.

In this case, these laser beams are emitted on a target point of each object while scanning plural target points that are set within the target area. For example, these target points are set within the target area in a lattice pattern at a number of m×n (m and n are natural numbers except 0), and each target point is irradiated by a laser beam with at least two pulses. In accordance with this pulse oscillation, the horizontal angle of the rotational optical portion 3 and the elevation angle of the rotational reflective mirror 302 are successively controlled.

In the step S606, the laser beams are reflected at an object in the target area and return to the distance measuring apparatus 1, and the reflected lights of the laser beams are spectrally separated by the selective reflective mirror 203 (see FIG. 4) according to the wavelengths. Then, the reflected lights are received by the first light receiving unit or the second light receiving unit. That is, when a pulsed laser beam having a wavelength of 1064 nm ($\lambda_1$) is emitted on the object, reflected light of the laser beam is received by the first light receiving unit 207. When a pulsed laser beam having a wavelength of 532 nm ($\lambda_2$) is emitted on the object, the reflected light of the laser beam is received by the second light receiving unit 208.

In a step S607, the comparing and judging unit 421 reads a content of setting regarding a distance to the object, which is set in the step S605. If a measurement range of long-distance is set, a trigger signal for stopping is output to the time-measuring unit 422 after a pulsed output (wavelength of 1064 nm=$\lambda_1$) of the first light receiving unit 207 is detected. If a measurement range of short-distance is set, a trigger signal for stopping is output to the time-measuring unit 422 after a pulsed output (wavelength of 532 nm=$\lambda_2$) of the second light receiving portion 208 is detected.

While the laser beam is emitted on the object in the step S606, a trigger signal for stopping is input to the time-measuring unit 422, and the time-measuring unit 422 stores a time of flight of the laser beam, which is counted, in a buffer and initializes the count. Then, a trigger signal for starting is input from the distance-measuring light emitting unit 205 again so as to measure the time. This process for measuring the time is repeated while distance-measuring light is continuously emitted on the target points in a lattice pattern in the target area set in the step S605.

The data processing unit 423 (see FIG. 6) reads out a sequence data of time of flight of the laser beam from the buffer of the time-measuring unit 422 into the RAM 402 (see FIG. 5). The data processing unit 423 measures the distance to the object by multiplying the time of flight and the light speed (step S608). According to the steps S601 to S608, the data processing unit 423 produces data of a three-dimensional point group of the target area based on the reference point. This data of the three-dimensional point group is connected to the image data of the target area, which is captured in the step S604, and is stored in the RAM 402. Information of distance that is measured is displayed at the indicating unit 404 (see FIG. 5). In order to finish measuring, the process proceeds from the step S609 to step S610 so as to complete the process. Otherwise, the process returns to the prior step of the step S605 so as to perform the following steps of the step S605.

Characteristics of First Operation for Measuring

According to the above first operation for measuring, the wavelength of a laser beam is manually selected in accordance with the relative length (short or long) of the measuring distance. That is, when the distance to an object is long, a mode for measuring a long distance is selected, and a laser beam having a wavelength of 1064 nm useful for transmitting a long distance is used. When the distance to an object is short, a mode for measuring a short distance is selected, and a laser beam having a wavelength of 532 nm, which is not useful for transmitting a long distance but has a high measurement resolution, is used. Therefore, in measuring long distances, a high-power laser beam having a short wavelength is not used, and safety for the eyes is thereby ensured, and the long distance can nevertheless be measured. In the case of measuring a short distance, a high measurement resolution can be obtained, and a short distance is thereby measured with a high measurement resolution whereas the apparatus can measure over long distances.

Second Operation for Measuring

Figure 8:
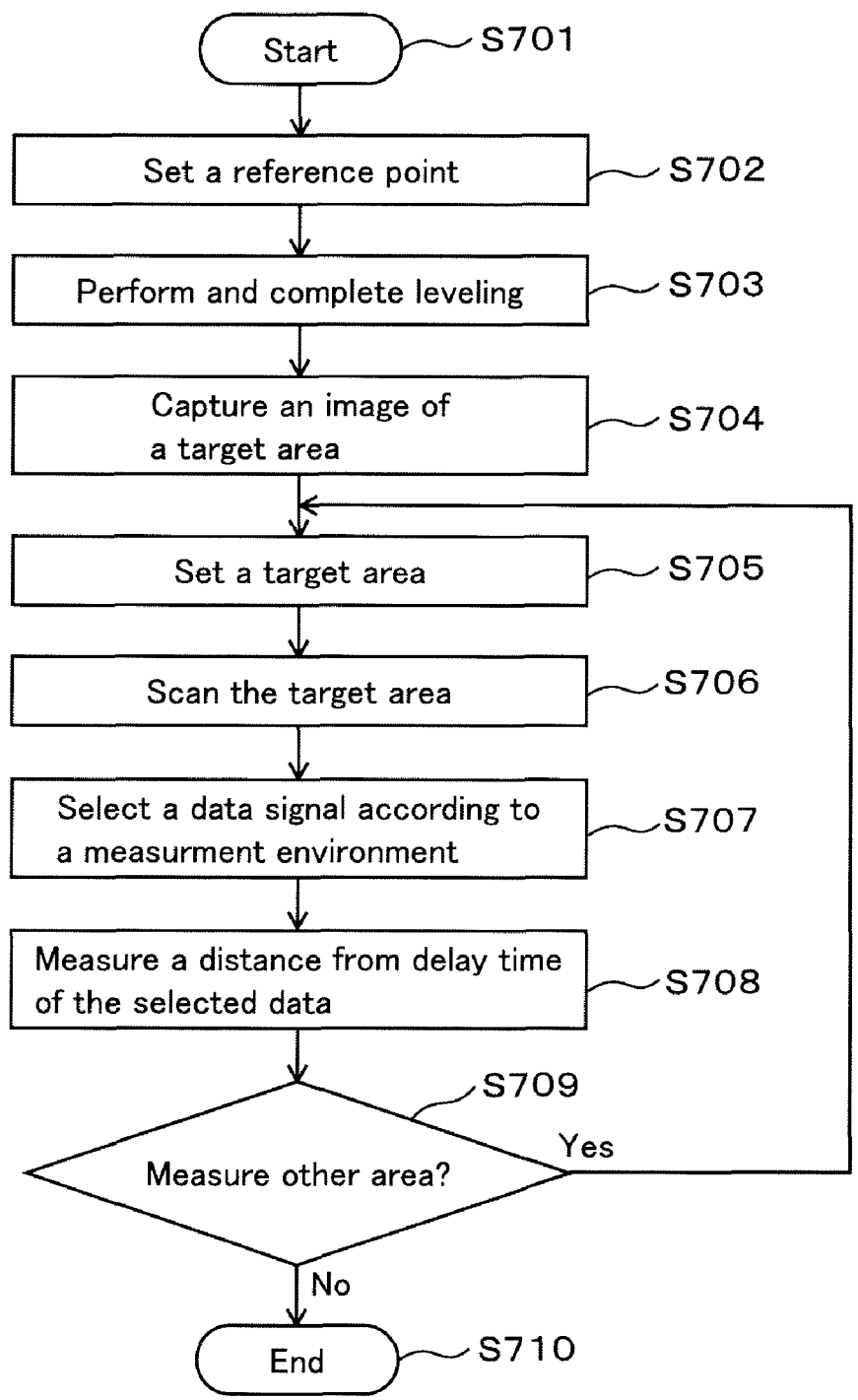
FIG. 8 is a flowchart showing an example of a procedure for measuring a distance.

An example of an operation will now be described, and the operation is performed by selecting the wavelength of a laser beam according to transparency of the air at a site in which a distance is measured. FIG. 8 is a flowchart showing an example of an operation procedure for measuring. Steps from the start of the process (step S701) to step S704 are the same as those of the steps S601 to S604 in FIG. 7. After the step S704 is performed, a target area is set (step S705).

In the step S705, an operator can select the transparency of the air in the measurement environment by a manual operation at the operating unit 414 (see FIG. 5). For example, the operating unit 414 may have a structure so that the transparency of the air is selected from among "good" and "bad". In this case, when the measurement is performed in an underground tunnel, a high-humidity environment due to the presence of fog, or a smoggy environment having a large amounts of dust, the operating unit 414 is set so that the transparency of the air is "bad". Accordingly, a high-power pulsed laser beam having a wavelength of 1064 nm can be used for measuring the distance.

The content of an image captured in the step S704 may be analyzed at the image processing unit 413 (see FIG. 5) so as to automatically calculate the transparency of the air in the measurement environment. The threshold level of the transparency of the air is appropriately selected. The process following a step S706 is the same as that following the step S606 in FIG. 7, and the description therefor is thereby omitted.

Characteristics of Second Operation for Measuring

According to the above second operation for measuring, the wavelength of a laser beam is selected in accordance with the transparency of the air in a measurement environment. That is, when the transparency of the air is high, light may not much scatter, whereby light having a short wavelength of 532 nm ($\lambda_2$) is selected. The light having a short wavelength is easily scattered by dust and water vapor, but a measurement can be performed at high resolution therewith.

On the other hand, when the transparency of the air in a measurement environment is low, light having a long wavelength of 1064 nm ($\lambda_1$) is selected because the light is less scattered by dust and water vapor. In this case, the measurement accuracy is not superior, but a distance can be measured in a bad condition in which the transparency of the air is bad. Thus, the wavelength of a laser beam is selected according to the transparency of the air in a measurement environment, whereby a distance can be measured even when the measurement environment is bad (even when the transparency of the air in the measurement environment is low). Moreover, when the measurement environment is good, the measurement can be performed at high accuracy.

Third Operation for Measuring

Figure 9:
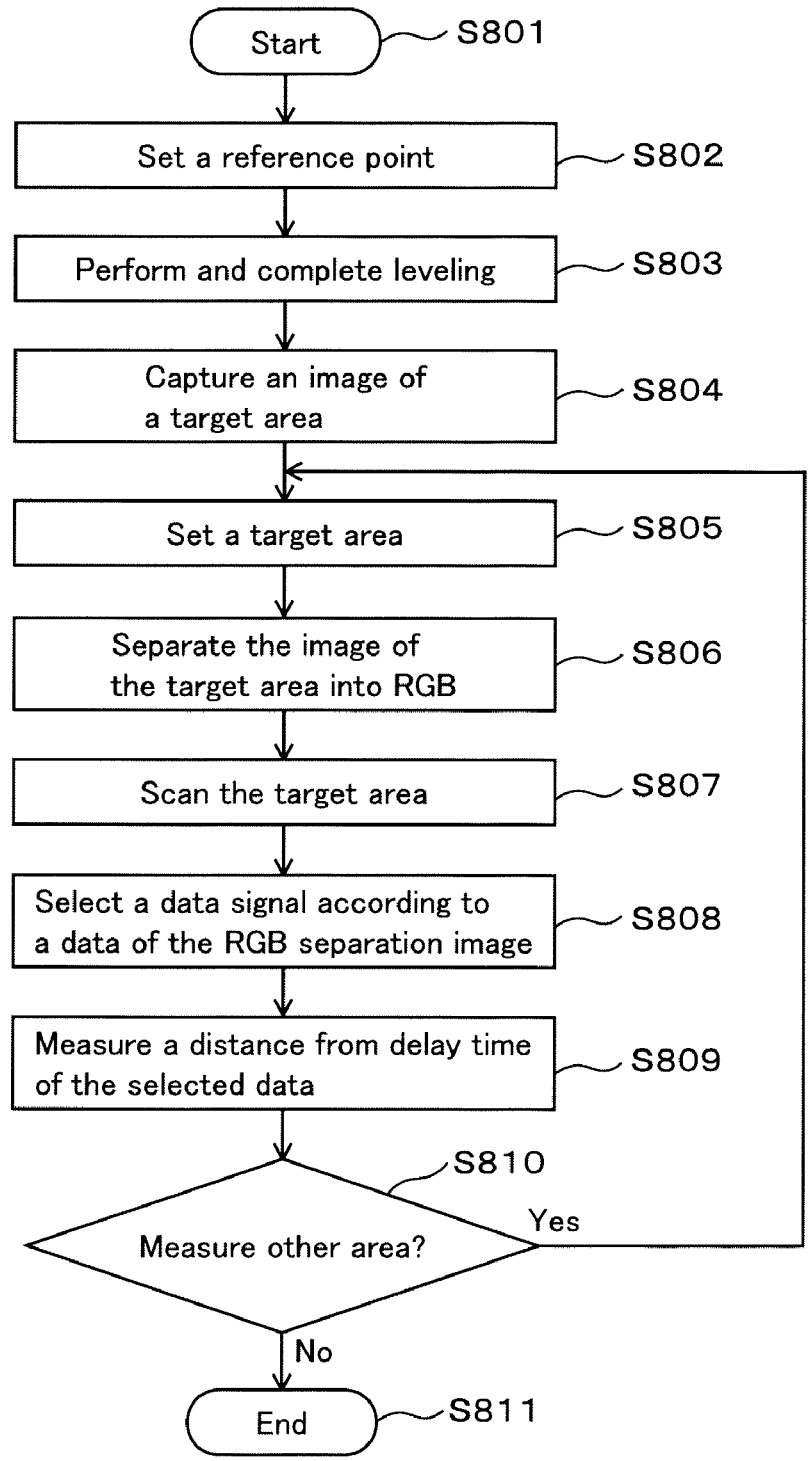
FIG. 9 is a flowchart showing an example of a procedure for measuring a distance.

An example of an operation will be described, and the operation is performed by selecting the wavelength of a laser beam according to the color of a target object. FIG. 9 is a flowchart showing an example of an operation procedure for measuring. Steps from the start of the process (step S801) to step S805 are the same as those of the steps S701 to S705 in FIG. 8.

After the step S805 is performed, image data captured in the step S804 is processed at the image processing unit 413 (see FIG. 5), and the image of a target area is separated into the three colors of RGB (red, green, and blue) and forms an RGB image (step S806). The data of the RGB image is stored in the RAM 402 (see FIG. 5). Then, the target area is scanned (step S807). In this case, the time-measuring unit 422 (see FIG. 6) stores sequence data of each target point in a buffer. The sequence data has the time of flight of a laser beam having a wavelength of 1064 nm ($\lambda_1$) and a laser beam having a wavelength of 532 nm (2).

The data processing unit 423 (see FIG. 6) reads out the data of the RGB image of the target area obtained in the step S806, and the data processing unit 423 performs the following steps. First, the RGB image of the target area is searched in turn from a pixel at the upper left. When the color components of R and B of the pixel are strong, data of the time of flight of a laser beam of $\lambda_1$ (wavelength of 1064 nm) is used for calculating the distance data of the target point. When the color component of G of the pixel is strong, data of the time of flight of a laser beam of $\lambda_2$ (wavelength of 532 nm) is used for calculating the distance data of the target point (step S808).

After the data of the time of flight is selected in the step S808, the data processing unit 423 multiplies the selected data of the time of flight and the light speed so as to measure a distance (step S809). The steps S808 and S809 are performed with respect to every pixel of the RGB image. The process following the step S810 is the same as that following the step S609 in FIG. 7, and the description therefor are thereby omitted.

Characteristics of Third Operation for Measuring

According to the third operation for measuring, when the color components of R and B of an object (target point) irradiated with a laser beam are relatively strong, a laser beam of $\lambda_1$ (wavelength of 1064 nm) is selected because the laser beam of $\lambda_1$ may be reflected to a greater degree. In this case, since the color components of R and B have a high absorption rate of light having a wavelength of 532 nm, a laser beam of 2 (wavelength of 532 nm) may not be reflected to a sufficient degree. On the other hand, when the color component of G of the object irradiated with a laser beam is relatively strong, the laser beam of $\lambda_2$ (wavelength of 532 nm) is selected because the laser beam of $\lambda_2$ may be reflected to a greater degree. In this case, since the color component of G has a high absorption rate of light having a wavelength of 1064 nm, the laser beam of $\lambda_1$ (wavelength of 1064 nm) may not be reflected to a sufficient degree. Therefore, a laser beam having a wavelength that may be reflected to a large degree is selected according to the color distribution in the target area, whereby a measuring error due to insufficiency of light reflected is reduced.

That is, the problem in which the reflection intensity of a target object depends on the wavelength of light may or can be avoided. There may be a case in which the intensity of reflected light is low, and it is not easily detected due to an inappropriate combination of a target object and the wavelength. In this case, two kinds of laser beams having different wavelengths can be used so as to assume the reflection state of a point that is irradiated with the laser beam based on an image analysis. According to the result, data of reflected light of one of the laser beams is selected, whereby data of reflected light in a greater amount that has been detected can be used.

Fourth Operation for Measuring

Figure 10:
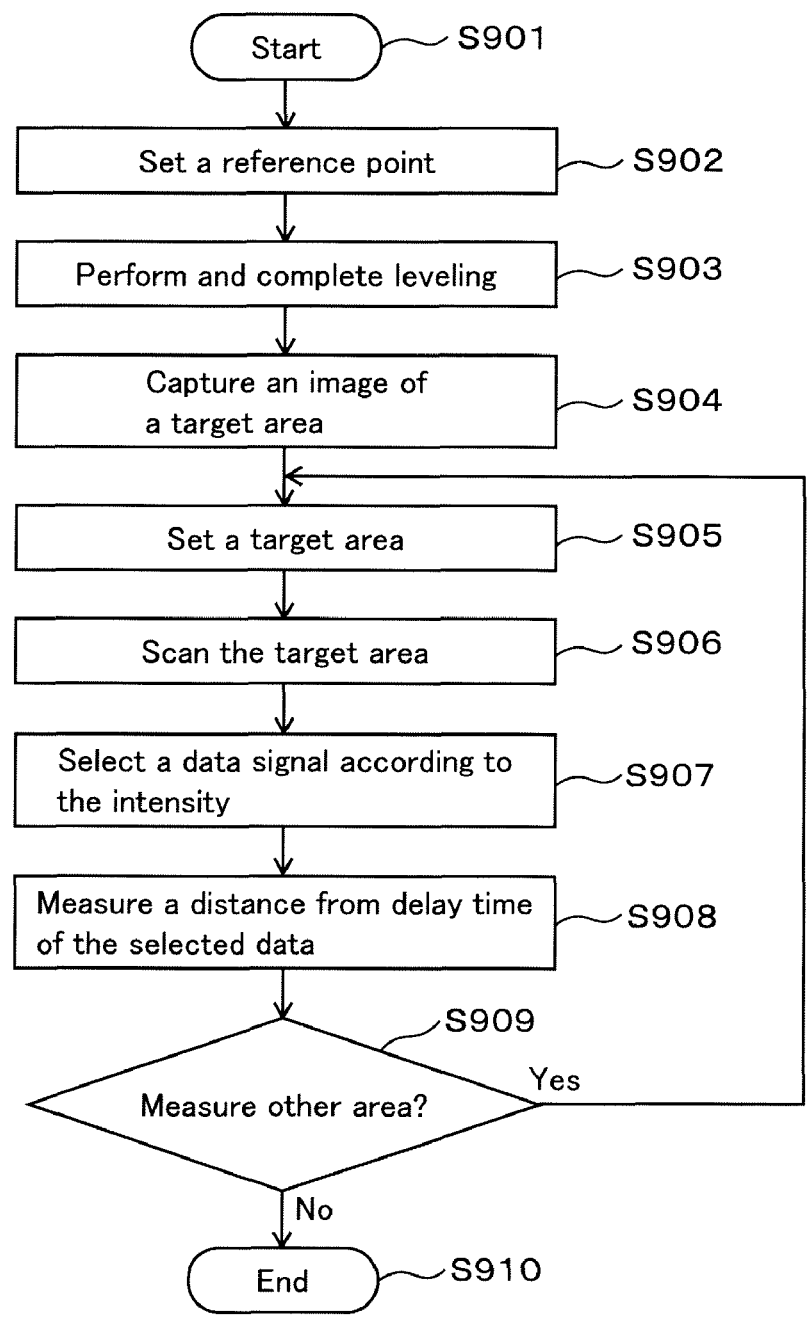
FIG. 10 is a flowchart showing an example of a procedure for measuring a distance.

An example of using data will be described, and the data includes time of flight of a laser beam having a wavelength, which is reflected at higher intensity than a laser beam having another wavelength. FIG. 10 is a flowchart showing an example of an operation procedure for measuring. Steps from the start of the process (step S901) to step S905 are the same as those of the steps S801 to S805 in FIG. 9.

While a laser beam having a wavelength of 1064 nm ($\lambda_1$) and a laser beam having a wavelength of 532 nm ($\lambda_2$) are simultaneously output, the target area is scanned (step S906). In this case, the comparing and judging unit 421 detects pulses of the two kinds of wavelengths so as to compare the intensities of light having a wavelength of $\lambda_1$ and light having a wavelength of $\lambda_2$ that are reflected at the same target point. Then, the comparing and judging unit 421 selects data of time of flight of the light having a wavelength, which is reflected at higher intensity, and stores the data in a buffer (step S907). The process following the step S908 is the same as that following the step S608 in FIG. 7, and the description therefor are thereby omitted.

Characteristics of Fourth Operation for Measuring

According to the fourth operation for measuring, the signal processing unit 412 selects data of time of flight of light, which is from the one of the laser beams having different wavelengths that is reflected at higher intensity, so as to measure a distance. Therefore, the measurement may or can be performed regardless of dust and dense fog, and the problem in which light may be reflected at low intensity according to the color of an object may or can be avoided.

(3) Third Embodiment

In the laser device 100 shown in FIG. 1, a laser beam having a wavelength of 1064 nm enters into the nonlinear crystal 107 as a fundamental wave, and a laser beam having a wavelength of 532 nm is generated as a second harmonic wave. Then, two kinds of the laser beams having different wavelengths are output at the same time. The laser beam is not limited to having two kinds of wavelengths (1064 nm and 532 nm), and a nonlinear crystal for generating a third harmonic wave, a fourth harmonic wave, or a fifth harmonic wave may be appropriately used. The laser beam having a wavelength of 808 nm, which is excited by the semiconductor laser unit 101, may be changed. In this case, a preferable laser device is incorporated to the apparatus in view of a measuring distance, measurement environment, the color of a target object, safety for the eyes, a production cost, and the like.

(4) Fourth Embodiment

Figure 11:
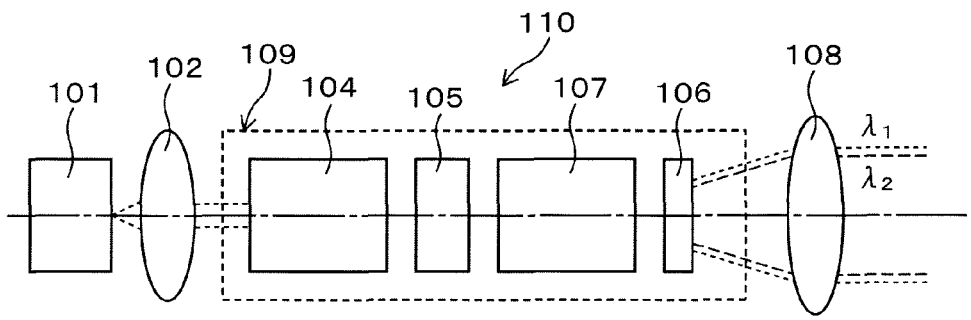
FIG. 11 is a schematic drawing showing an example of a laser device which generates a high-power second harmonic wave.

A structural example of a laser device for generating a high-power second harmonic wave will be described hereinafter. FIG. 11 is a schematic drawing showing an example of the laser device. Some reference numerals shown in FIG. 11 are the same as those in FIG. 1 and indicate the same structures as those in FIG. 1. The laser device 110 comprises a nonlinear crystal 107 in the laser resonator 109, which is different from the structure of the laser device 100 in FIG. 1.

Accordingly, a laser beam having a wavelength of 1064 nm is excited at the semiconductor laser unit 101 and is radiated by stimulated emission, and the laser beam is transmitted through the nonlinear crystal 107, thereby producing a second harmonic wave. Then, the laser beam is reflected repeatedly between the output mirror 106 and the mirror surface coated on the laser medium 104 at a side into which the excited laser beam enters. That is, the laser beam having a wavelength of 1064 nm repeatedly passes through the nonlinear crystal 107, whereby conversion efficiency of the second harmonic wave is improved, and a high-power laser beam having a wavelength of 532 nm can be generated by Q-switching. In this case, a high-power laser beam having a short wavelength of 532 nm is output, whereby the laser beam may not be scattered by moisture in the air under high-humidity environment, and detection errors can be reduced.

(5) Fifth Embodiment

In the laser device 100 shown in FIG. 1, the optical axis of the collimator lens 108 is adjusted so that two kinds of laser beams having different wavelengths ($\lambda_1$=1064 nm, $\lambda_2$=532 nm) are approximately transformed into parallel light flux (collimated). These two kinds of laser beams have a different refractive index with respect to the nonlinear crystal 107, and these two kinds of laser beams are thereby difficult to collimate exactly. In this case, an example of a laser device will be described, and in the laser beam, two kinds of laser beams having different wavelengths are exactly collimated and have the same beam diameter.

Figure 12A:
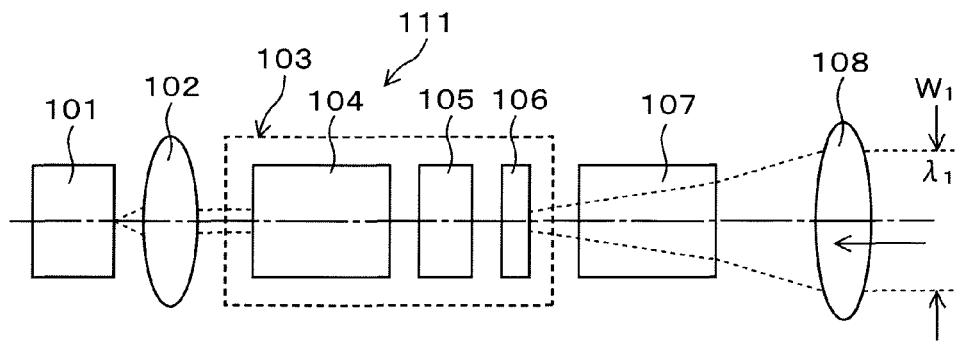
FIGS. 12A and 12B are schematic drawings showing an operation of a laser device having a movable collimator lens.
Figure 12B:
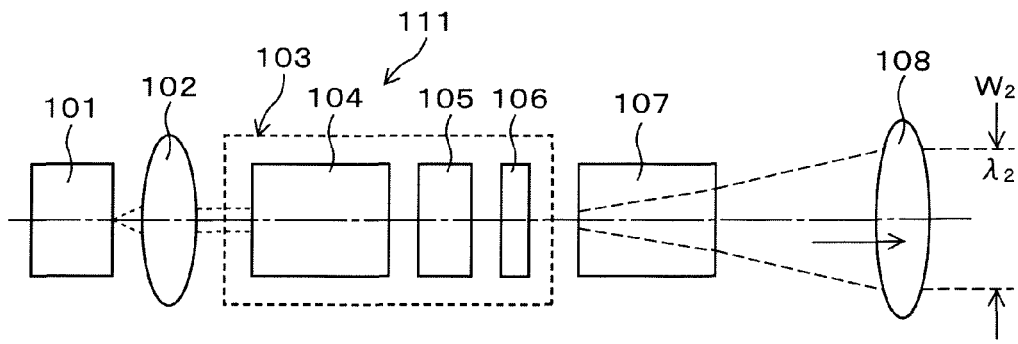

FIGS. 12A and 12B show a laser device 111 in which a collimator lens 108 is movable backward and forward. FIG. 12A is a drawing showing the laser device 111 in which the collimator lens 108 is moved backward, and FIG. 12B is a drawing showing the laser device 111 in which the collimator lens 108 is moved forward. The laser device 111 comprises a moving device (not shown in the figure) for moving the collimator lens 108 backward and forward on the optical axis, and the laser device 111 comprises other portions that are same as those in FIG. 1. The moving device comprises a small stepping motor and a movable stage fixed with the collimator lens 108, whereby the collimator lens 108 can be positioned accurately.

When a laser beam having a long wavelength ($\lambda_1$=1064 nm) is emitted, the collimator lens 108 is moved backward (the left direction in FIG. 12A), and the laser beam having $\lambda_1$ is transformed into parallel light flux. When a laser beam having a short wavelength ($\lambda_2$=532 nm) is emitted, the collimator lens 108 is moved forward (the right direction in FIG. 12B), and the laser beam having $\lambda_2$ is transformed into parallel light flux. In this case, the two kinds of laser beams having different wavelengths are emitted so as to have the same beam diameter. That is, a beam diameter $W_1$ of the laser beam having a wavelength of 1064 nm ($\lambda_1$) shown in FIG. 12A and a beam diameter $W_2$ of the laser beam having a wavelength of 532 nm ($\lambda_2$) are the same.

An operation of a distance measuring apparatus 1 (see FIG. 4) using the laser device 111 will be briefly described with reference to the flowchart of FIG. 7. First, an operator sets a measuring distance by eye in the step S605 for setting a target area. In this case, when the measuring distance is long, the collimator lens 108 is moved backward to a position for a laser beam having a long wavelength as shown in FIG. 12A. On the other hand, when the measuring distance is short, the collimator lens 108 is moved forward to a position for a laser beam having a short wavelength as shown in FIG. 12B. Then, the target area is scanned (step S606). The distance measuring apparatus 1 performs the same operation in the case of the flowchart of FIG. 8.

The case of the flowchart of FIG. 9 will be briefly described. First, in the step S806, the distance measuring apparatus 1 processes data for selecting one of a laser beam having a long wavelength or a laser beam having a short wavelength with respect to every pixel of RGB image of the target area. Then, in the step S807 for scanning the target area, the distance measuring apparatus 1 emits a laser beam on one of the target points in a direction that corresponds to each pixel of the RGB image. In this case, if the target point has strong components of R and B, the collimator lens 108 is moved so that a laser beam having a wavelength of 1064 nm is emitted. If the target point has a strong component of G, the collimator lens 108 is moved so that a laser beam having a wavelength of 532 nm is emitted.

That is, in the distance measuring apparatus 1, the target area is scanned while the collimator lens 108 is successively moved with respect to each pixel of the RGB image. In this case, two kinds of the laser beams having different wavelengths emitted are collimated and have the same beam diameter, thereby improving resolution (accuracy) of data of a three-dimensional point group, which will be formed after the distance measuring apparatus 1 scans the target area. Therefore, resolution may not depend on the wavelength of a laser beam used in a measurement.

The present invention may be used for a distance measuring apparatus for measuring distances using laser beams.

What is claimed is:

1. A distance measuring apparatus for measuring distances to a target point in a target area, comprising:
   a laser oscillator for generating a laser beam having a first wavelength;
   a nonlinear crystal into which the laser beam having the first wavelength generated by the laser oscillator enters, the nonlinear crystal generating a laser beam having a second wavelength;
   a collimator lens at which the laser beam having the first wavelength generated by the laser oscillator and the laser beam having the second wavelength generated by the nonlinear crystal are concentrated and are transformed into parallel light flux;
   an output unit for outputting the parallel light flux of the laser beam having the first wavelength and the laser beam having the second wavelength at the same time, while scanning the target area;
   a dichroic mirror provided with a first reflective surface and a second reflective surface, wherein the first reflective surface selectively reflects the laser beam having the first wavelength towards a target point in a target area, and the second reflective surface selectively reflects the laser beam having the second wavelength towards the target point in the target area;
   a first light receiving unit that receives the laser beam having the first wavelength that was selectively reflected by the first reflective surface and outputs a first signal;
   a second light receiving unit that receives the laser beam having the second wavelength that was selectively reflected by the second reflective surface and outputs a second signal; and
   a signal processing unit for measuring a distance to the target point in the target area by selecting one of the first signal and the second signal and determining the distance based on information regarding the laser beam associated with which one of the first signal and the second signal is selected by the signal processing unit.

2. The distance measuring apparatus according to claim 1, wherein the laser beam having the first wavelength is infrared light having a longer wavelength, and the laser beam having the second wavelength is a second harmonic wave of the first wavelength and is visible light having a shorter wavelength.

3. The distance measuring apparatus according to claim 1, wherein the laser oscillator comprises a laser medium, and the laser medium comprises one of a crystal and a fiber doped with one of $Nd^{3+}$ and $Er^{3+}$.

4. The distance measuring apparatus according to claim 1, further comprising an operating unit, wherein the laser beam having the first wavelength is used in a first measurement range and the laser beam having the second wavelength is used in a second measurement range; and wherein the operating unit selects one of the first measurement range and the second measurement range.

5. The distance measuring apparatus according to claim 1, further comprising an operating unit for selecting a transparency of air in the target area, and wherein the signal processing unit measures the distance to the measuring unit in the target area by selecting one of the first signal and the second signal according to the transparency of the air in the target area selected by the operating unit.

6. The distance measuring apparatus according to claim 1, further comprising an image capturing unit for capturing an image of the target area and an image processing unit for separating the image, which is captured by the image capturing unit, into an image of three colors of red, green, and blue, and wherein the signal processing unit measures the distance to the measuring unit in the target area by selecting one of the first signal and the second signal according to the color components of the image in which colors are separated by the image processing unit.

7. The distance measuring apparatus according to claim 1, wherein the signal processing unit measures the distance to the measuring unit in the target area by selecting one of the first signal and the second signal according to the intensity of light received at the first light receiving unit and the second light receiving unit.

8. The distance measuring apparatus according to claim 1, wherein the information is a speed and time of flight of the laser beam associated with which one of the first signal and the second signal is selected by the signal processing unit.

* * * * *